United States Patent [19]
Minelly et al.

[11] Patent Number: 5,526,175
[45] Date of Patent: Jun. 11, 1996

[54] OPTICAL AMPLIFIER WITH AUTOMATIC SELF ADJUSTING GAIN SPECTRUM

[75] Inventors: John D. Minelly; Richard I. Laming, both of Southampton, England

[73] Assignee: University of Southampton, Hampshire, England

[21] Appl. No.: 322,740

[22] Filed: Oct. 13, 1994

Related U.S. Application Data

[63] Continuation of Ser. No. 28,653, Mar. 9, 1993, abandoned.

[30] Foreign Application Priority Data

Mar. 23, 1992 [GB] United Kingdom ............... 9206304

[51] Int. Cl.$^6$ .................................. H01S 3/06; G02B 6/26
[52] U.S. Cl. .......................... 359/341; 359/174; 385/5; 372/23
[58] Field of Search ........................ 359/174, 341; 385/1, 2, 5, 9, 10; 330/4; 372/6, 23

[56] References Cited

U.S. PATENT DOCUMENTS

| | | | |
|---|---|---|---|
| 3,868,589 | 2/1975 | Wang | 372/23 |
| 4,358,851 | 11/1982 | Scifres et al. | 372/97 |
| 4,405,199 | 9/1983 | Lyons | 359/174 |
| 5,050,949 | 9/1991 | DiGiovanni et al. | |
| 5,117,303 | 5/1992 | Desurvire et al. | 359/341 |
| 5,148,510 | 9/1992 | Borrelli et al. | 385/142 |

FOREIGN PATENT DOCUMENTS

| | | |
|---|---|---|
| 0426222 | 5/1991 | European Pat. Off. |
| 441211A2 | 8/1991 | European Pat. Off. .......... H01S 3/06 |
| 2199423 | 7/1988 | United Kingdom . |
| 9118434 | 11/1991 | WIPO . |

OTHER PUBLICATIONS

Li et al, IEEE Infocan '94, pp. 130–137.
Su et al, IEEE Photonics, Technology Letters, vol. 4, #3, pp. 269–271, Mar. 1992.
Richardson et al, Electron. Lett., vol. 26, #21, pp. 1779–1781, Oct. 11, 1990.
Tachibana et al, IEEE Photonics Tech. Lett., vol. 3, #2, Feb. 1991, pp. 118–120.
Gills et al, IEEE Photonic Technology Letters, 2(1990) Dec., #12, N.Y. USA, pp. 866–868.
Paulsen et al, Prop. SPIE, In. Soc. Opt. Eng., vol. 1581, pp. 107–113, Jun. 1991.

*Primary Examiner*—Nelson Moskowitz
*Attorney, Agent, or Firm*—Brooks Haidt Haffner & Delahunty

[57] ABSTRACT

An optical amplifier for amplifying signals of different wavelengths throughout a spectral window modifies the amplification of each signal such that the output levels of the signals are more equal than the input levels thereof when the input levels differ by more than a predetermined amount. In one embodiment this is achieved by providing a dichroic reflector at one end of an amplifying fibre so that standing wave patterns are set up in the amplifying fibre by interference of the forward and reflected signal lights, at the different wavelengths, the signal at each wavelength preferentially decreasing its own gain with increasing signal level.

30 Claims, 6 Drawing Sheets

Even mode

FIG. 6b

Odd mode

OPTICAL AMPLIFIER WITH AUTOMATIC SELF ADJUSTING GAIN SPECTRUM

This application is a continuation of application Ser. No. 08/028,653, filed Mar. 9, 1993, now abandoned.

One of the inventors named in this application, Richard Ian Laming, is named as an inventor in application Ser. No. 10,478 filed Jan. 28, 1993, now U.S. Pat. No. 5,260,823, which is a continuation of application Ser. No. 703,264 filed May 21, 1991, now abandoned which claims priority of United Kingdom application 9011330 filed May 21, 1990.

This invention relates to optical amplifiers for amplifying signals of different wavelengths, and is particularly, but not exclusively, applicable to optical amplifiers having an active fibre, such as a rare-earth-doped optical fibre as a gain medium.

Rare-earth-doped optical fibre amplifiers, particularly using erbium-doped fibre, have recently attracted very considerable attention in the field of optical fibre communications. An erbium-doped fibre amplifier conveniently operates in the preferred telecommunications spectral window located at a wavelength of 1.55 μm. In addition, it has been shown to have high polarisation insensitive gain (greater than 30 dB), low crosstalk between signals at different wavelengths, good saturation output power (>1 mW) and a noise figure close to the fundamental quantum limit (approximately 3 dB). The excellent noise characteristics potentially allow hundreds of amplifiers to be incorporated along the length of a fibre telecommunications link, which could then span more than 10,000 km. Compared to the alternative of a transmission link with electronic repeaters, an all optical link has the merit that it is transparent to the transmission-code format and bit-rate. It can thus be upgraded by changing only the transmitter and receiver, and not the repeaters. In addition the optical amplifier can simultaneously amplify several optical channels and thus wavelength division multiplexing of several optical channels can be employed to expand the capacity of the link.

The 3 dB gain bandwidth of erbium doped fibre amplifiers is typically in the range 3–8 nm but can be increased to around 30 nm with a technique such as disclosed in GB-A-2246234. However, in these cases the gain band is not flat and may exhibit a small ripple (±1 dB). Combined with wavelength dependent losses in the transmission fibre and optical components in the link such variations can limit the number of amplifiers that can be cascaded before a significant difference in net gain develops between the channels. Ideally the signal levels should be actively compensated after each amplifier to maintain all channels at an equal level.

A broad object of the invention is to provide an optical amplifier for amplifying signals of different wavelengths throughout a spectral window which modifies the amplification of each signal such that the output levels of the signals are more equal than the input levels thereof when the input levels differ by more than a predetermined amount. The spectral window may be as low as about 5 nm and is preferably at least 10 nm.

The gain available in erbium-doped fibre amplifiers saturates with increasing input signal intensity and provides a self-limiting mechanism for the amplifier. The erbium ion in silica-based optical fibre material is predominantly homogeneously broadened. Thus, the gain spectrum decreases relatively uniformly even if one input signal is substantially larger than the others and no significant spectral gain compensation occurs. Conversely, in a largely inhomogeneously broadened gain medium the small-signal gain for each channel would be unaltered. However, if one signal were large, it would saturate and decrease its own gain whilst leaving that seen by the other channels unaffected. Thus, this would provide automatic spectral gain compensation.

In typical alumino-silicate core optical fibres for amplifier applications the erbium ions exhibit homogeneous and inhomogeneous linewidths of 11.5 nm and 11.5 nm respectively. Further contributions to the homogeneous linewidth of Stark splitting and a Boltzmann thermal distribution results in an effective homogeneous linewidth in excess of 25 nm near room temperature. Thus, no significant spectral gain compensation occurs intrinsically in this material. Alternatively, in a germano-silicate glass host the erbium ion exhibits homogeneous and inhomogeneous linewidths of 4 nm and 7 nm respectively. An insignificant amount of spectral gain compensation is observed in this host, however, and this is at the expense of a much reduced amplifier bandwidth of only a few nanometers.

In one aspect, the invention contemplates the use of a host glass material in an erbium-doped fibre amplifier in which the erbium ions exhibit a decreased homogeneous linewidth but increased inhomogeneous linewidth to maintain the bandwidth for providing improved spectral gain compensation and thus amplifier flatness.

In this connection, the invention includes an optical amplifier for amplifying signals of different wavelengths throughout a spectral window of at least 5 nm which modifies the amplification of each signal such that the output levels of the signals are more equal than the input levels thereof when the input levels differ by more than a predetermined amount, the amplifier comprising a rare earth, preferably erbium, doped fibre the characteristics of which are to cause said modification of the amplification of each signal.

It may, however, be preferable in many circumstances to retain the conventional glass composition and introduce an effective reduction in homogeneity with an increase in inhomogeneous broadening by an alternative route for example by spatial hole burning. The gain medium is configured such that the intensity of signal light is modulated periodically along the gain medium with period proportional to wavelength. The population inversion in the gain medium, and thus the local gain, is reduced at the peaks of the intensity distribution. The amplification is a product of the signal intensity at a given point and the population inversion at that point. A different signal wavelength will set up a different intensity distribution and thus the gain of the two wavelengths will be partially decoupled. Thus for the case when one signal is larger than the other spatial hole-burning will preferentially decrease its gain resulting in a form of automatic spectral gain compensation.

In this aspect, the invention includes an optical amplifier for amplifying signals of different wavelengths throughout a spectral window of at least 5 nm which modifies the amplification of each signal such that the output levels of the signals are more equal than the input levels thereof when the input levels differ by more than a predetermined amount, the amplifier including modifying means for causing said modification of the amplification of each signal, said modifying means comprising means for setting up a spatial pattern in a gain medium of the amplifier, or means for spatially separating the signals.

In this aspect the invention also includes an optical amplifier for amplifying signals of different wavelengths having a gain medium and means for setting up a spatial intensity pattern in the gain medium or spatially separating the different wavelengths thereby to provide for or allow automatic spectral gain compensation.

When a spatial intensity pattern is used, the above-defined amplifier may include means for inputting said signals into said gain medium at one end thereof and a mirror at an opposite end thereof for reflecting said signals, thereby to set up said spatial intensity pattern in the gain medium.

As an alternative, the gain medium may be placed in a sagnac loop configuration to set up a said spatial intensity pattern in the gain medium.

In each case, the gain medium is preferably an active fibre—an erbium doped fibre being presently preferred although fibres doped with other rare earths are contemplated.

When spatial separation is used the gain medium of the amplifier may be an optical fibre having two cores at least one of which is active and said cores are arranged such that signals couple between the cores to become spatially separated. In this case, the or each active core is preferably erbium doped.

As an alternative, the means for spatially separating the different wavelengths may comprise first optical means downstream of said gain medium, there being means for modifying the level of signals of the spatially separated wavelengths downstream of said first optical means and second optical means for recombining said modified spatially separated signals downstream of said level modifying means.

One or each of the above-mentioned optical means may comprise a grating or a prism.

The level modifying means may comprise a non-linear intensity dependent absorbing or amplifying device. In one preferred arrangement this device comprises an array of self-electro-optic effect devices.

In the amplifier defined above the gain medium upstream of the first optical means may be an active fibre, preferably an erbium doped fibre.

In order that the invention may be well understood, some embodiments thereof, which are given by way of example only, will now be described with reference to the accompanying drawings, in which.

Figure 1:
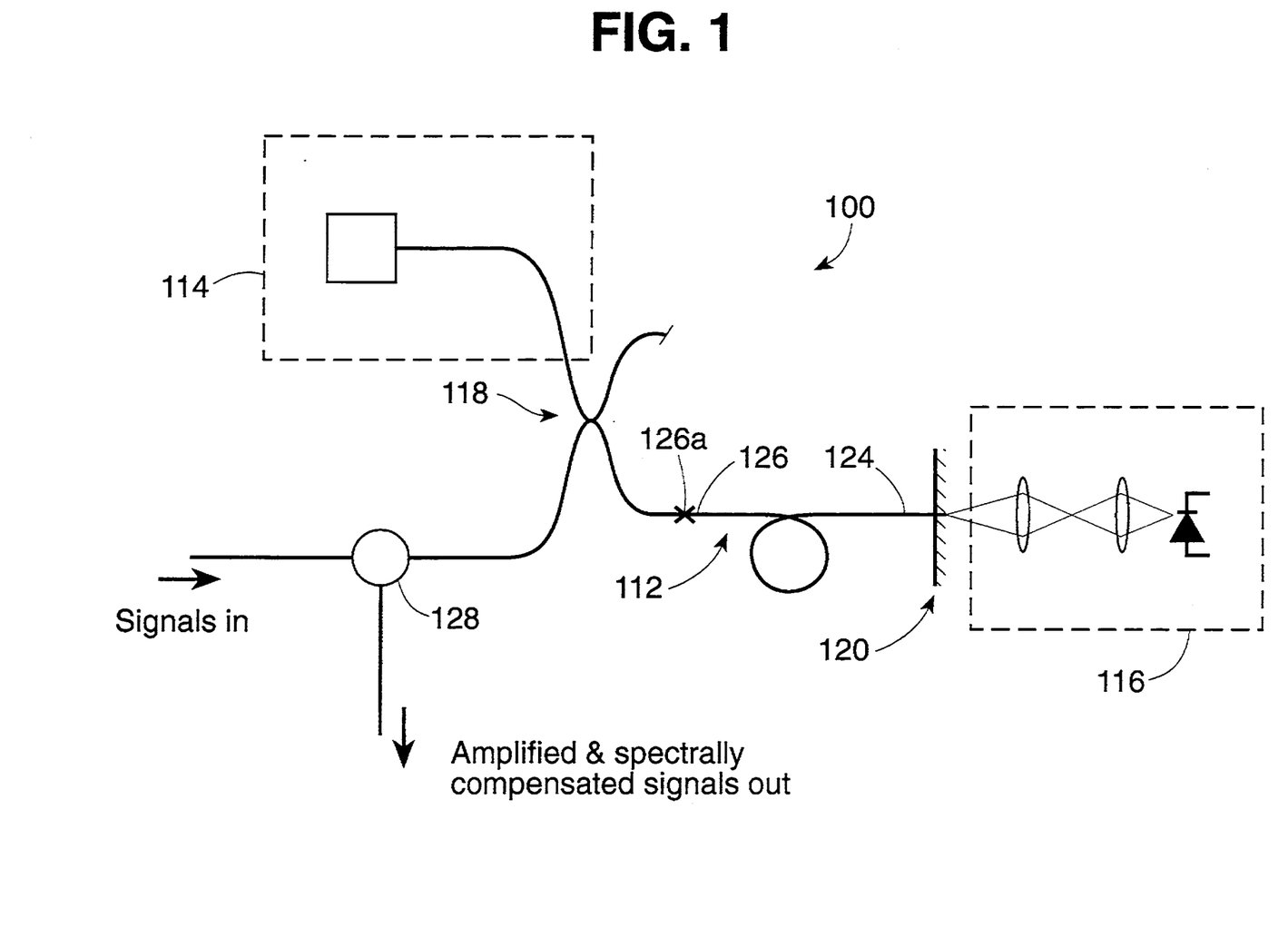
FIG. 1 schematically shows a first amplifier.
Figure 2:
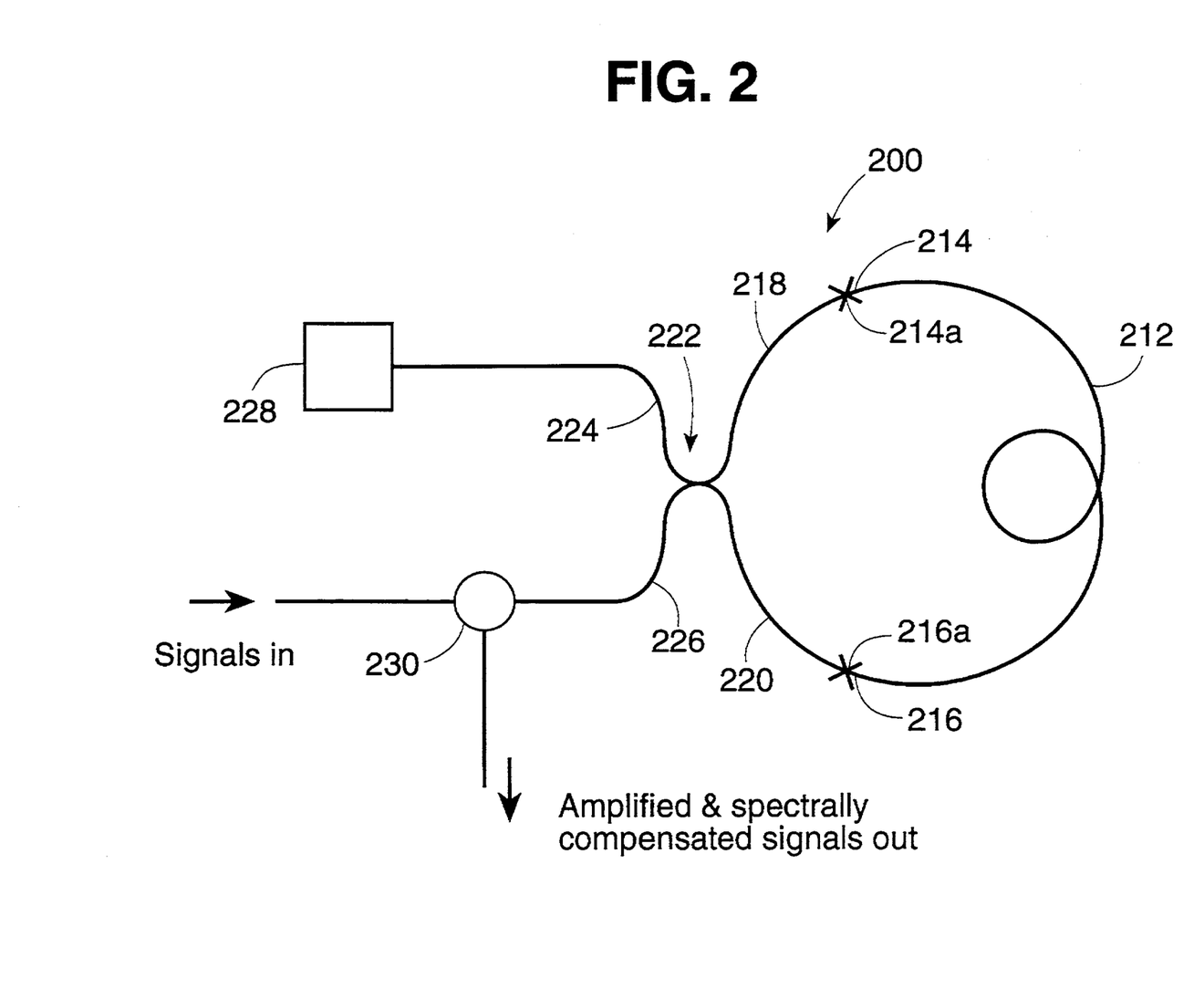
FIG. 2 schematically shows a second amplifier.

The amplifiers 100 and 200 shown in FIGS. 1 and 2 are examples of amplifiers in which a spatial, or periodic, intensity pattern is set up in the gain medium to provide for automatic spectral gain compensation.

In FIG. 1 the amplifier 100 has a gain medium comprising an erbium doped amplifying fibre 112 pumped by a pump diode source 114 or 116 at 1480 or 980 nm for amplifying signal light of different wavelengths throughout a spectral window of at least 20 nm and preferably about 30 nm located at about 1550 nm. Pump light for the pump source 114 is supplied to the erbium doped fibre 112 via a dichroic coupler 118 and splice 126a together with signal light. Alternatively pump light from the pump source 116 is supplied to the fibre 112 via a dichroic end reflector 120 which is provided at the end 124 of the fibre 112, which is opposite the end 126 into which the signal light is supplied, for reflecting the signal light and allowing passage of the pump light. A standing wave pattern is set up by interference of the forward and reflected signal light in the amplifier fibre 112. Signal light at different wavelengths will set up standing wave patterns of different periods. Thus, each signal preferentially decreases it own gain with increasing signal level. The signal is coupled in and out via an optical circulator 128.

It will be understood that both pump sources 114 and 116 may be provided or only one of them, but if pump source 116 is omitted, the dichroic reflector 120 is still required.

Referring to FIG. 2 the amplifier 200 comprises an erbium doped amplifying fibre 212 placed in a sagnac loop. The ends 214, 216 of the fibre 212 are spliced at splices 214a and 216a to the ends of two output fibre tails 218,220 of a coupler 222 which has two input fibre tails 224, 226.

Input fibre tail 224 receives pump light from a pump diode source 228 of, for example, 1480 or 980 nm, which is supplied via the output fibre tail 220 of the coupler 222 to the amplifying fibre 212. Signal light at different wavelengths throughout a spectral window of at least 20 nm and preferably about 30 nm located at about 1550 nm is received from an optical circulator 230 by input fibre tail 226, split into two by the coupler 222 and supplied via the two output fibre tails 218, 220 to the amplifying fibre 212. In this way a standing wave pattern is set up by interference of the signal light travelling from end 214 to end 216 of the fibre 212 and the signal light travelling from end 216 to end 214 of the fibre 212, and as discussed above in connection with the arrangement of FIG. 1, each signal preferentially decreases its own gain with increasing signal level. The amplified signal light is coupled together again by the coupler 222 and directed via tail 226 to the optical circulator 230.

Figure 3:
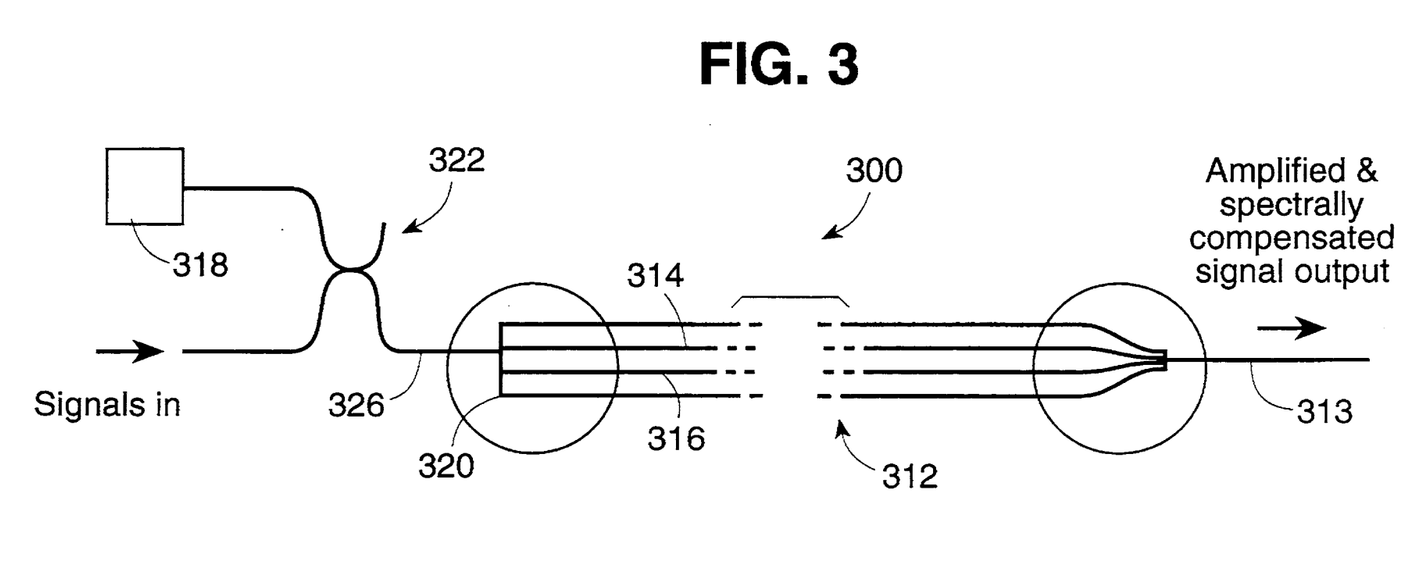
FIG. 3 schematically shows a third amplifier including an amplifying fibre having two cores.
Figure 7:
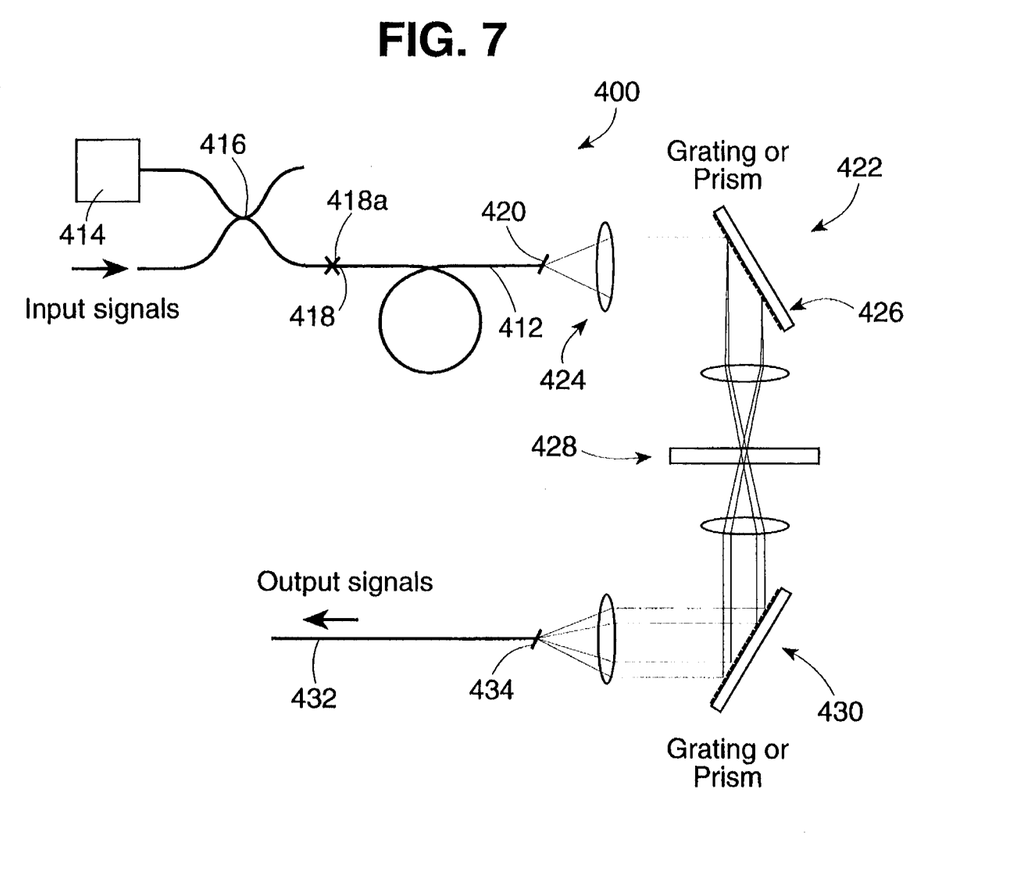
FIG. 7 schematically shows a fourth amplifier.

The amplifiers 300 and 400 shown in FIGS. 3 and 7 are examples of amplifiers in which signals of different wavelengths are spatially separated to provide for or allow automatic spectral gain compensation.

Figure 4:
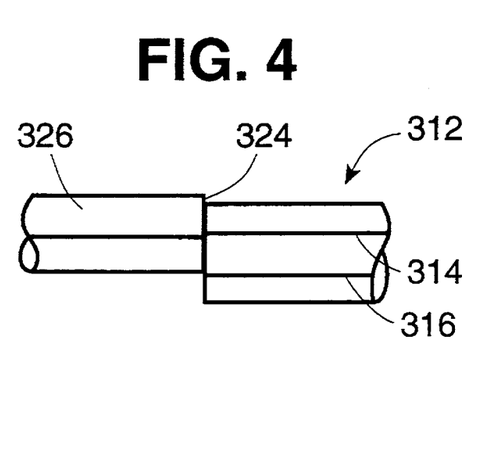
FIGS. 4 and 5 are enlarged details IV and V of FIG. 3.

In FIG. 3, the amplifier 300 has a gain medium which comprises an amplifying optical fibre 312 having two cores 314,316 at least one of which is active by being doped with erbium. Pump light, for example, at 1480 or 980 nm from a pump diode source 318 is supplied to end 320 of the fibre 312 via a dichroic coupler 322 which also supplies signal light at different wavelengths throughout a spectral window of at least 20 nm and preferably about 30 nm located at about 1550 nm to the fibre end 320. The pump and signal light may be launched into one (as better illustrated in FIG. 4) or each of the cores 314, 316 via a fusion splice 324 between the fibre 312 and a single mode output fibre tail 326 of the coupler. The cores are arranged such that optical power at each wavelength couples sinusoidally between the two cores down the fibre with a typical coupling length of about 1 cm. The coupling length for this process is a function of the optical wavelength and thus the different signal wavelengths preferentially interact with different erbium ions. As a result automatic spectral gain compensation of the signals at the single diode output fiber 313 is obtained.

Figure 5:
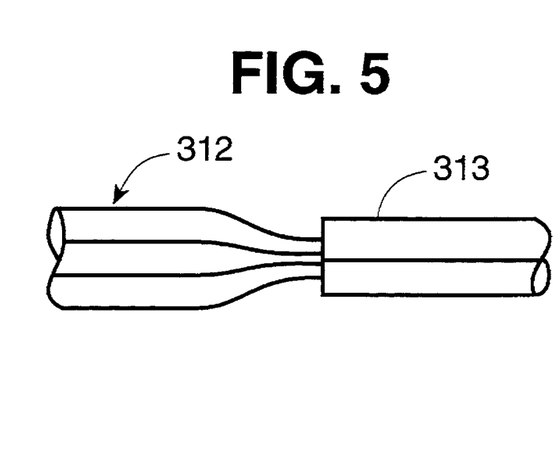
Figure 6A:
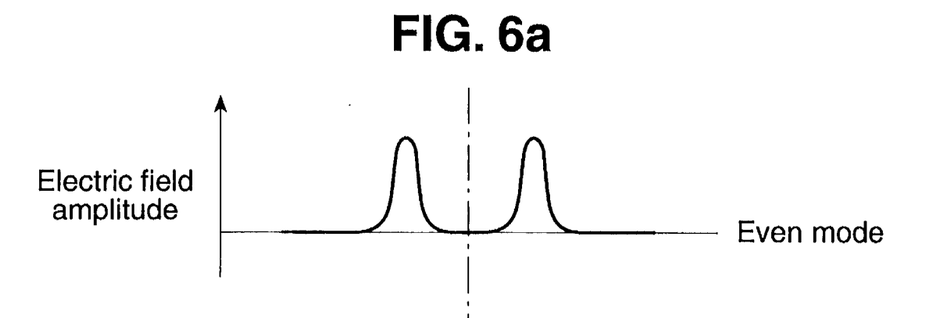
FIGS. 6a–6c illustrate the even and odd modes of the amplifying fibre of the amplifier of FIG. 4.
Figure 6B:
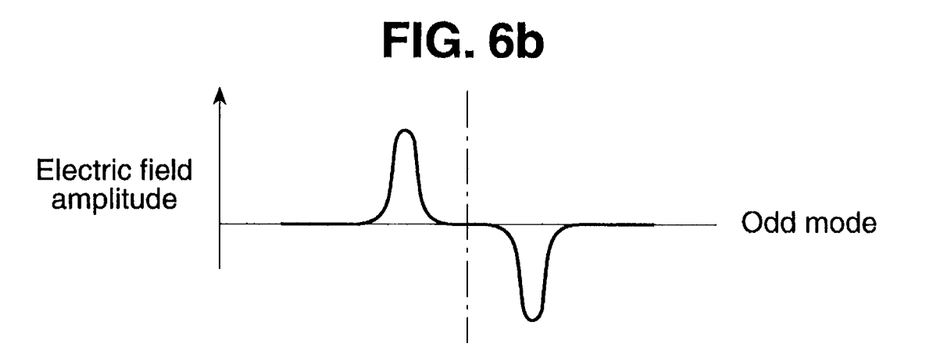
Figure 6C:
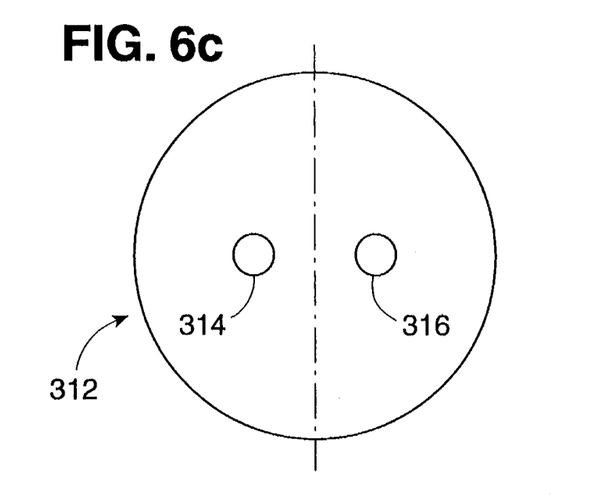

The two cores of the fibre 312 could be identical, to provide approximately 100% coupling at all wavelengths. Alternatively, the propagation constants might only be matched at the signal wavelengths such that there is low coupling at the pump wavelength but approximately 100% coupling at the signal wavelengths. The coupling length would be designed to be in the range 100 μm to 1 m and the length of the amplifying fibre 312 would be in the range 10cm to 100 km. At the output of the amplifying fibre 312 the power is split arbitrarily between the two cores 314, 316 since the total fibre length cannot be an exact integer number of coupling lengths for all possible signal wavelengths. The distribution of power between the two cores of a twincore fibre is a result of the superposition of an even and odd mode which have equal power irrespective of wavelength as shown in FIGS. 6a, 6b and 6c. These two modes travel at different velocities and thus result in the observed coupling of power between the two cores. For small core to core separations tapering the twincore fibre at the output end to approximately one half its original diameter (as indicated in FIG. 5) results in the cutoff of the odd (second) mode. The even mode which then approximates well to a Guassian can be coupled without significant loss into a single-mode fibre. An advantage of this technique is that the power in the even mode is independent of the precise amplifier length. Thus the periodic coupling of the light between the two cores as it propagates provides automatic gain compensation whilst tapering at the output removes any wavelength sensitivity due to the exact power distribution in the two cores with only approximately 3 dB output penalty. Other types of mode transformers such as the Y-junction could also be used to the same effect at the amplifier output end.

The amplifier 400 shown in FIG. 7 includes an amplifying fibre 412 which comprises an erbium doped fibre. Pump light at 1480 or 980 nm is supplied from a pump source 414 via a dichroic coupler 416 and splice 418a to an input end 418 of the amplifying fibre 412. Signals of different wavelengths throughout a spectral window of at least 20 nm and preferably about 30 nm located at about 1550 nm are also supplied to the amplifying fibre input end 418. The amplified signal lights at the different wavelengths from the output end 420 of the amplifying fibre are spatially separated by first optical means 422 comprising collimating means 424 for collimating the amplified output signal lights and a grating 426 or prism. The spatially separated signal lights are then passed through a means 428 for modifying their amplification such that the output levels of the signals are more equal than the levels of the signals inputted to the amplifying fibre. The modifying means may comprise a non-linear intensity dependent absorbing or amplifying device such as an array of self-electro-optic devices (seeds) or a suitable semiconductor material. The modified spatially separated signals are then recombined downstream of the modifying means 428 by a second optical means 430 comprising collimating means and a grating or prism and fed back into a transmission fibre 432 at the output 434 of the amplifier.

It will be appreciated that in the above arrangement the modifying means 428 performs spectral reshaping since it acts independently on the spatially separated signals.

Figure 8:
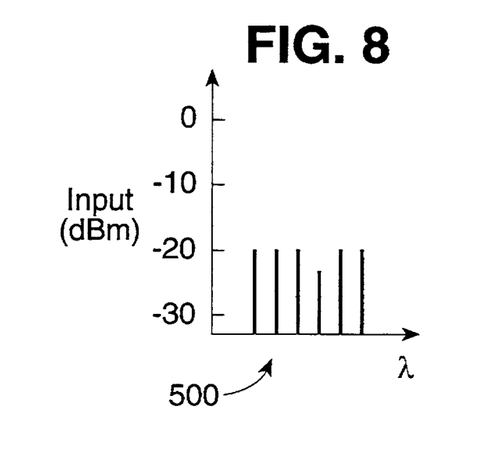
FIGS. 8–13 illustrates the input, output and gain spectra of a known amplifier and an amplifier embodying the present invention.
Figure 9:
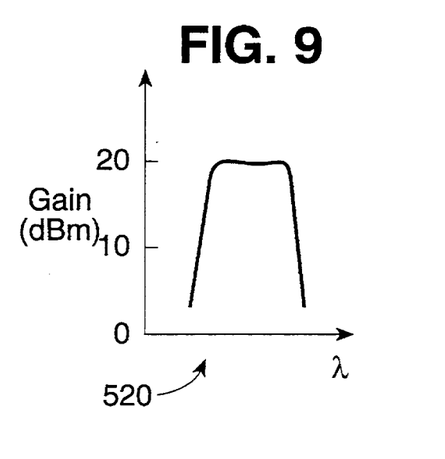
Figure 10:
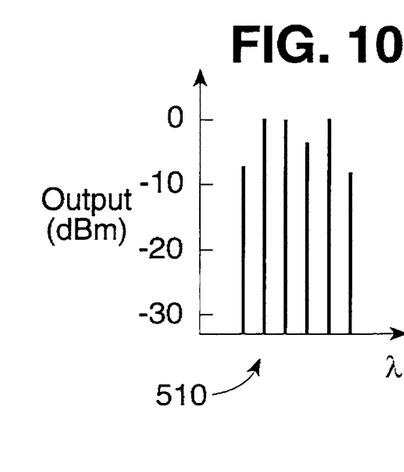
Figure 11:
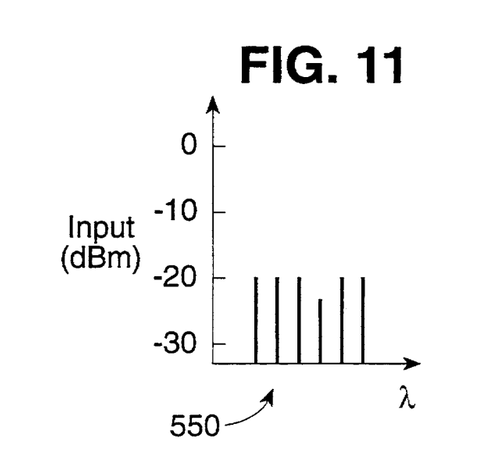
Figure 12:
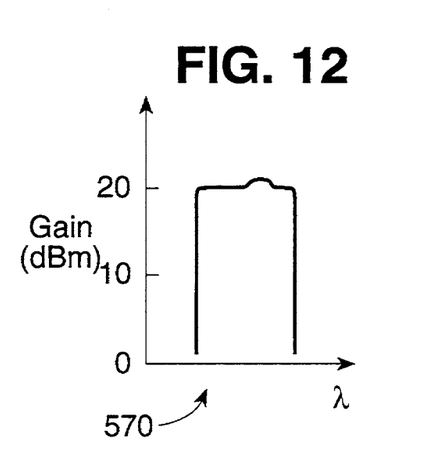
Figure 13:
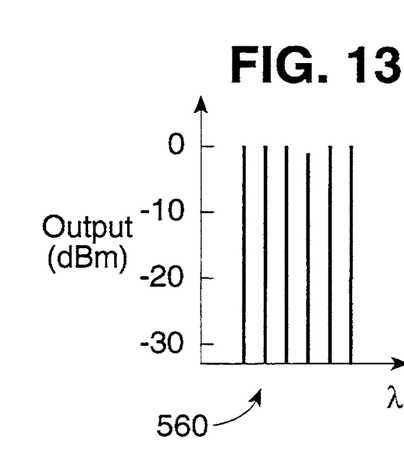

In order to illustrate the advantage of providing automatic spectral gain compensation reference is made to FIGS. 8–13 which shows in FIGS. 8–10 how an input signal spectrum 500 (FIG. 8) is amplified to an output signal spectrum 510 (FIG. 10) using an amplifier such as disclosed in GB-A-2246234 having a gain spectrum 520 (FIG. 9). As will be seen, input signals at different wavelengths represented as vertical lines throughout a spectral window are amplified in accordance with the gain spectrum 520 to provide output signals, and as the gain spectrum is substantially flat across the spectral window the output levels of the signals are markedly less equal than the input levels thereof. The FIGS. 11–13 show how an identical input signal spectrum 550 (FIG. 11) to spectrum 500 is typically amplified to an output signal spectrum 560 (FIG. 13) when using an amplifier embodying the present invention. In this case, the gain spectrum for the input signal spectrum 550 is illustrated at 570 (FIG. 12) and indicates the presence of automatic spectral gain compensation. As will be clear, the amplification of the input signals at different wavelengths represented by vertical lines is modified such that the output levels of the signals are more equal than the input levels thereof.

It will be understood that if the levels of the input signals are substantially equal, the levels of the output signals will be less equal using either an amplifier as disclosed in GB-A-2246234 or an amplifier in accordance with the present invention having automatic spectral gain compensation, because of the ripple on the substantially flat portion of the gain spectra. Furthermore, when such amplifiers are cascaded, signals whose levels are originally substantially equal will become successively less equal as they pass through the amplifiers. However, if the amplifiers have automatic spectral gain compensation in accordance with the invention, once the levels of the signals differ by more than a predetermined amount an amplifier having such signals inputted will modify the amplification of those signals such that the output levels are more equal than the input levels. Eventually the output levels stabilise such that they are substantially as equal as the input levels.

We claim:

1. An optical fiber amplifier having an input and an output and for amplifying a plurality of input signals supplied substantially simultaneously to said input at a plurality of different wavelengths and throughout a spectral window, at least one of which signals having an amplitude different from others of said signals, and means supplying said signals at different wavelengths substantially simultaneously to said input, said optical fiber amplifier including means for supplying pumping energy to the optical fiber and signal amplitude responsive equalizing means for causing the corresponding output signals at said output to be at least relatively more nearly equal in amplitude than the amplitudes of said signals at said input when the amplitudes of said input signals differ by more than a predetermined amount, said equalizing means comprising means for spatially separating the power of said input signals by wavelength and for modifying the gain for the spatially separated signals in said amplifier in accordance with the amplitudes of said input signals so that the gain for higher amplitude spatially separated signals is less than the gain for lower amplitude spatially separated signals and that the amplitudes of the signals at said output are relatively more nearly equal than the amplitudes of the signals supplied to said input.

2. An optical fiber amplifier having an input and an output and for amplifying a plurality of input signals at a plurality of different wavelengths throughout a predetermined spectral window supplied substantially simultaneously to said input, at least one of which signals having an amplitude different from others of said signals, said amplifier comprising signal amplitude responsive equalizing means for causing the amplitudes of the corresponding signals at said output to be at least relatively more nearly equal than the amplitudes of said signals at said input when the amplitudes of said input signals differ by more than a predetermined amount, said amplifier comprising:

a length of a gain medium which is formed in a Sagnac loop configuration, which is pumpable by light energy at a pump wavelength, and in which said plurality of signals form a spatial intensity pattern, when said signals are applied to said gain medium, said spatial intensity pattern causing said at least said one of said signals to be provided with a different amount of gain than others of said signals thereby to provide automatic spectral gain compensation.

3. An optical amplifier as claimed in claim 2, wherein said gain medium is an active fibre.

4. An optical amplifier as claimed in claim 3, wherein said active fibre is an erbium doped fibre.

5. An optical amplifier having an input and an output for amplifying a plurality of input signals at a plurality of different wavelengths throughout a predetermined spectral window supplied substantially simultaneously to said input, at least one of which signals having an amplitude different from others of said signals, said amplifier comprising signal amplitude respsonsive equalizing means for causing the corresponding output signals at said output to be at least relatively more nearly equal in amplitude than the amplitude of said signals at said input when the amplitudes of said input signals differ by more than a predetermined amount, said amplifier comprising:

a length of a gain medium; and said equalizing means comprising spatial separation and combining means for separating said input signals and combining said output signals, said spatial separation means operating on the amplitudes of said signals to provide automatic gain compensation for input signals in said predetermined spectral window.

6. An optical amplifier as claimed in claim 5 wherein said gain medium is an optical fibre having two cores at least one of which is active and said cores are arranged such that signals couple between the cores to become spatially separated.

7. An optical amplifier as claimed in claim 6, wherein the or each active core is erbium doped.

8. An optical amplifier as claimed in claim 5, wherein said spatial separation means comprises:

first optical means downstream of said gain medium, amplitude modifying means for modifying the amplitude of signals of the spatially separated wavelengths downstream of said first optical means, and second optical means for recombining said modified spatially separated signals downstream of said amplitude modifying means.

9. An optical amplifier as claimed in claim 8, wherein one or each of said optical means comprises a grating.

10. An optical amplifier as claimed in claim 8, wherein one or each of said optical means comprises a prism.

11. An optical amplifier as claimed in claim 8, wherein said level modifying means comprises a non-linear intensity dependent absorbing or amplifying device.

12. An optical amplifier as claimed in claim 11, wherein said device comprises an array of self-electro-optic effect devices.

13. An optical amplifier as claimed in claim 7, wherein said gain medium is an active fibre.

14. An optical amplifier as claimed in claim 13 wherein said optical fibre comprises an erbium doped fibre.

15. An optical fiber amplifier having an input and an output and for amplifying a plurality of input signals at different wavelengths throughout a spectral window of at least 5 nm supplied substantially simultaneously to said input, at least one of which signals having an amplitude different from others of said signals, said amplifier comprising signal amplitude responsive equalizing means for causing the amplitudes of the corresponding signals at said output to be at least relatively more nearly equal in amplitude than the amplitudes of said signals at said input when the amplitudes of said signals differ by more than a predetermined amount, said amplifier comprising:

a length of a gain medium, which is pumpable by light energy at a pump wavelength, and said equalizing means comprising means for setting up a spatial intensity pattern in said gain medium, when said signals are applied to said gain medium.

16. An optical amplifier as claimed in claim 15, wherein said gain medium is a rare earth, doped fibre, the characteristics of which are to cause said modification of the amplification of each signal.

17. A method for amplifying a plurality of signals at a plurality of different wavelengths throughout a spectral window of at least 5 nm, at least one of said signals having a different amplitude, said signals passing through a length of a gain medium, which is pumpable by light energy at a pump wavelength, which has an input and an output and in which said signals form a spatial intensity pattern, when said signals are applied to said gain medium, said method comprising the following steps:

(a) supplying said signals substantially simultaneously to said input;

(b) forming said spatial intensity pattern of said signals within said gain medium; and (c) modifying the amplification of each signal in said pattern in accordance with the amplitude thereof so that the signal amplitudes at said output are at least relatively more nearly equal to each other than the input amplitudes thereof, when the signal input amplitudes differ by more than a predetermined amount.

18. An optical amplifier as set forth in claim 16, wherein said rare earth is Erbium.

19. An optical amplifier having an input and an output and for amplifying a plurality of input signals at a plurality of different wavelengths throughout a spectral window of at least 5 nm supplied substantially simultaneously to said input, at least one of said signals having an amplitude different from the amplitudes of other said signals, said amplifier comprising:

a length of a gain medium, which is pumpable by light energy at a pump wavelength; and signal amplitude responsive equalizing means for causing the relative amplitudes of the signals at said output to be at least relatively more nearly equal than the amplitudes of said signals at said input when the amplitudes of said signals differ by more than a predetermined amount, said equalizing means comprising spatial separation means for separating by wavelength the power of the plurality of input signals, said spatial separation means operating to modify the amplification of each input signal in accordance with the amplitude of the input signals, when said signals are applied to said gain medium.

20. A method for amplifying a plurality of signals substantially simultaneously supplied at different wavelengths throughout a spectral window of at least 5 nm, said method comprising the following steps:

(a) spatially separating the plurality of signals from each other;

(b) modifying the amplification of each signal in accordance with the amplitude thereof so that the signal output amplitudes are at least relatively more nearly equal to each other than the input amplitudes thereof, when the signal input amplitudes differ by more than a predetermined amount; and (c) spatially recombining the plurality of signals.

21. A method as claimed in claim 20 wherein said signals are spatially separated in a gain medium.

22. A method as claimed in claim 20, wherein said signals are spatially separated downstream of a gain medium.

23. A method for amplifying a plurality of signals substantially simultaneously supplied at different wavelengths throughout a spectral window of at least 5 nm, said method comprising the following steps:

(a) supplying at least two said signals to an active fiber of a fiber optical amplifier, said fiber pumpable by light energy at a pump wavelength;

(b) supplying said light energy at said pump wavelength to the active fiber;

(c) forming a wavelength dependent spatial intensity pattern of each of said at least two signals in the active fiber, whereby the output amplitudes of said at least two signals from said active fiber are at least relatively more nearly equal to each other than the input amplitudes thereof, when the signal input amplitudes differ by more than a predetermined amount.

24. The method of amplifying signals of different wavelengths according to claim 23, wherein each of said at least two signals decreases its own gain with increasing signal amplitude in said spatial intensity pattern.

25. The method of amplifying signals of different wavelengths according to claim 23, wherein different signal wavelengths of said at least two signals set up different spatial intensity patterns and the gain at said different signal wavelengths are at least partially decoupled.

26. A method for amplifying a plurality of signals substantially simultaneously supplied at a different wavelengths throughout a spectral window of at least 5 nm, said method comprising the following steps:

(a) supplying at least two said signals to an active fiber of a fiber optical amplifier, said fiber being pumpable by light energy at a pump wavelength;

(b) supplying said light energy at said pump wavelength to the active fiber;

(c) spatially separating said at least two signals downstream of said active fiber; and (d) modifying the amplification of said at least two signals in accordance with their amplitudes when spatially separated so that the output amplitudes of said at least two signals are at least relatively more nearly equal than the input amplitudes thereof, when the input amplitudes differ by more than a predetermined amount.

27. A method for amplifying a plurality of signals simultaneously supplied at different wavelengths throughout a spectral window of at least 5 nm, said method comprising the following steps:

(a) supplying at least two said signals to an active fiber of a fiber optical amplifier, said fiber pumpable by light energy at a pump wavelength;

(b) supplying said light energy at said pump wavelength to the active fiber; and (c) spatially separating said at least two signals in said active fiber, whereby the amplified output amplitudes of said at least two signals are at least more nearly equal than the input amplitudes thereof, when the input amplitudes differ by more than a predetermined amount.

28. An optical fiber amplifier as set forth in claim 1 wherein said optical fiber is a gain medium and said signals substantially are supplied to one end thereof and said equalizing means comprises a mirror at the opposite end of said fiber for reflecting said signals into said optical fiber and thereby separating the energy of said signals by wavelength.

29. An optical fiber amplifier as set forth in claim 1 wherein said signal amplitude responsive equalizing means comprises a doped amplifying fiber formed in a Sagnac loop configuration in which said input signals form a spatial intensity pattern.

30. An optical fiber amplifier as set forth in claim 1 wherein said optical amplifier comprises optical amplifying fiber doped with rare earth ions and said equalizing means comprises another optical fiber coupled to said amplifying fiber for transferring signal power between said amplifying fiber and said another optical fiber, the coupling length being selected so that signals of different wavelengths interact with different rare earth ions in said amplifying fiber.

* * * * *

UNITED STATES PATENT AND TRADEMARK OFFICE
CERTIFICATE OF CORRECTION

PATENT NO. : 5,526,175
DATED : June 11, 1996
INVENTOR(S) : Minelly et al

It is certified that error appears in the above-indentified patent and that said Letters Patent is hereby corrected as shown below:

Col. 3, line 8, after "set up" delete "a";

Col. 10, line 24, cancel "substantially".

Signed and Sealed this

Eighteenth Day of February, 1997

Attest:

BRUCE LEHMAN

*Attesting Officer*       *Commissioner of Patents and Trademarks*

UNITED STATES PATENT AND TRADEMARK OFFICE
CERTIFICATE OF CORRECTION

PATENT NO. : 5,526,175
DATED : June 11, 1996
INVENTOR(S) : Minelly et al.

It is certified that error appears in the above-indentified patent and that said Letters Patent is hereby corrected as shown below:

Col. 10, line 5, after "signals" insert --substantially--;

Col. 10, line 17, after "least" insert --relatively--.

Signed and Sealed this

First Day of April, 1997

*Attest:*

BRUCE LEHMAN

*Attesting Officer*     *Commissioner of Patents and Trademarks*